United States Patent
Imai et al.

(10) Patent No.: US 7,221,404 B2
(45) Date of Patent: May 22, 2007

(54) VIDEO SIGNAL PROCESSING METHOD AND DEVICE

(75) Inventors: Seiko Imai, Chiba (JP); Toshio Sarugaku, Chiba (JP); Naoki Kaneko, Kanagawa (JP); Takaya Hoshino, Saitama (JP)

(73) Assignee: Sony Corporation, Tokyo (JP)

( * ) Notice: Subject to any disclaimer, the term of this patent is extended or adjusted under 35 U.S.C. 154(b) by 521 days.

(21) Appl. No.: 10/492,381

(22) PCT Filed: Aug. 15, 2003

(86) PCT No.: PCT/JP03/10385

§ 371 (c)(1),
(2), (4) Date: Apr. 12, 2004

(87) PCT Pub. No.: WO2004/017626

PCT Pub. Date: Feb. 26, 2004

(65) Prior Publication Data

US 2005/0002637 A1 Jan. 6, 2005

(30) Foreign Application Priority Data

Aug. 15, 2002 (JP) ............................. 2002-237055

(51) Int. Cl.
*H04N 5/00* (2006.01)
*H04N 5/21* (2006.01)
*H04N 7/01* (2006.01)
*H04N 11/20* (2006.01)

(52) U.S. Cl. ...................... 348/458; 348/443; 348/448; 348/606; 348/607; 348/625; 348/628

(58) Field of Classification Search ................ 348/458, 348/459, 443, 448, 606, 607, 625, 628; 382/263, 382/264, 260, 266; *H04N 5/00, 5/21, 7/01, H04N 11/20*
See application file for complete search history.

(56) References Cited

U.S. PATENT DOCUMENTS

| 4,733,300 A | 3/1988 | Sugiyama et al. |
| 5,016,103 A | 5/1991 | Rabii |

(Continued)

FOREIGN PATENT DOCUMENTS

EP    0 610 701    8/1994

(Continued)

*Primary Examiner*—Brian P. Yenke
(74) *Attorney, Agent, or Firm*—Frommer Lawrence & Haug LLP; William S. Frommer; Thomas F. Presson (57) ABSTRACT

To enable a satisfactory suppression of overemphasized component after converting the number of scanning lines of video signal, when the video signal is converted in the number of scanning lines and a high-frequency component at least in a vertical direction of the converted video signal is emphasized, signals delayed by a plurality of stages of time equal to or more than a time required for converting the number of scanning lines are obtained by a delay circuit 18, and an appropriate delay signal is selected from among the plurality of delay signals by a selection circuit 19. The selected delay signal is compared with the emphasized video signal in emphasized-component detector circuits 16a, 16b and the overemphasized component is detected. Processing to suppress the emphasis is performed by suppressor circuits 13a, 13b with respect to a portion where the overemphasized signal component is detected.

10 Claims, 6 Drawing Sheets

U.S. PATENT DOCUMENTS

| | | | |
|---|---|---|---|
| 5,307,164 A * | 4/1994 | Dong-Il | 348/448 |
| 5,847,774 A | 12/1998 | Cho | |
| 6,281,933 B1 * | 8/2001 | Ritter | 348/447 |
| 6,424,383 B1 * | 7/2002 | Terai et al. | 348/628 |
| 6,864,923 B2 * | 3/2005 | Minami | 348/625 |

FOREIGN PATENT DOCUMENTS

| | | |
|---|---|---|
| EP | 1 011 264 | 6/2000 |
| EP | 1 011 265 | 6/2000 |
| JP | 6-153025 | 5/1994 |
| JP | 6-315098 | 11/1994 |
| JP | 7-107341 | 4/1995 |
| JP | 11-355613 | 12/1999 |
| WO | WO 02/37835 | 5/2002 |

* cited by examiner

VIDEO SIGNAL PROCESSING METHOD AND DEVICE

TECHNICAL FIELD

The present invention relates to a video-signal processing method and apparatus, particularly to a processing technique for suppressing adaptively an excessive emphasis of signal when the number of scanning lines of a video signal is converted twice by a double-speed conversion and the like for making an enhancement processing of its picture-quality.

BACKGROUND ART

As a number-of-scanning-line conversion apparatus for converting, for example, 525 scanning lines per frame of video signal on NTSC system or 625 scanning lines per frame of video signal on PAL system to 1050 or more scanning lines, such apparatus that classifies an input picture depending on its pattern and processes every pattern so as to make the picture have higher definition was proposed in the past (Japanese Laid-Open Patent Application No. H7-75066).

By employing such number-of-scanning-line conversion apparatus, it is possible to improve remarkably the quality of, for example, natural picture taken by camera. In such apparatus, however, in order to improve the picture quality particularly in a vertical direction, a process for emphasizing a high-frequency component in the vertical direction is provided. In that case, there may be no problem with the above-described natural picture, whereas with an artificial picture such as a telop superimposed on the natural picture, a bad effect will be caused that part of picture has an excessive high intensity and so on.

Specifically, in the telop superimposed on a natural picture for example, the frequency in a vertical direction is extremely high at its edge portion. Thus, if the high-frequency component in the vertical direction is emphasized in such picture, an intensity level at the edge portion will be too high and become liable to be noticed. For this reason, deterioration of picture quality such as so-called line flicker and defocus due to characteristics of a cathode-ray tube for displaying the picture will arise.

In addition, such picture-quality deterioration will also be caused, in the other case than the above-described telop, for example, when the menu for adjusting a television set is superimposed on a natural picture for display. Moreover, the emphasis on high-frequency component in the vertical direction of picture is not limited to the video-signal processing which performs the number-of-scanning-line conversion with high accuracy as described above, and is also applied to the number-of-scanning-line conversion by so-called vertical interpolation or general vertical enhancement. In these cases, the picture-quality deterioration described above will be caused likewise.

In order to solve this problem, the applicants of the present invention proposed previously a video-signal processing apparatus in which an image-processed signal and an original signal are compared with a reference level, and these signals are switched over to be taken out depending on the comparison result (Japanese Laid-Open Patent Application No. H11-355613).

Figure 1:
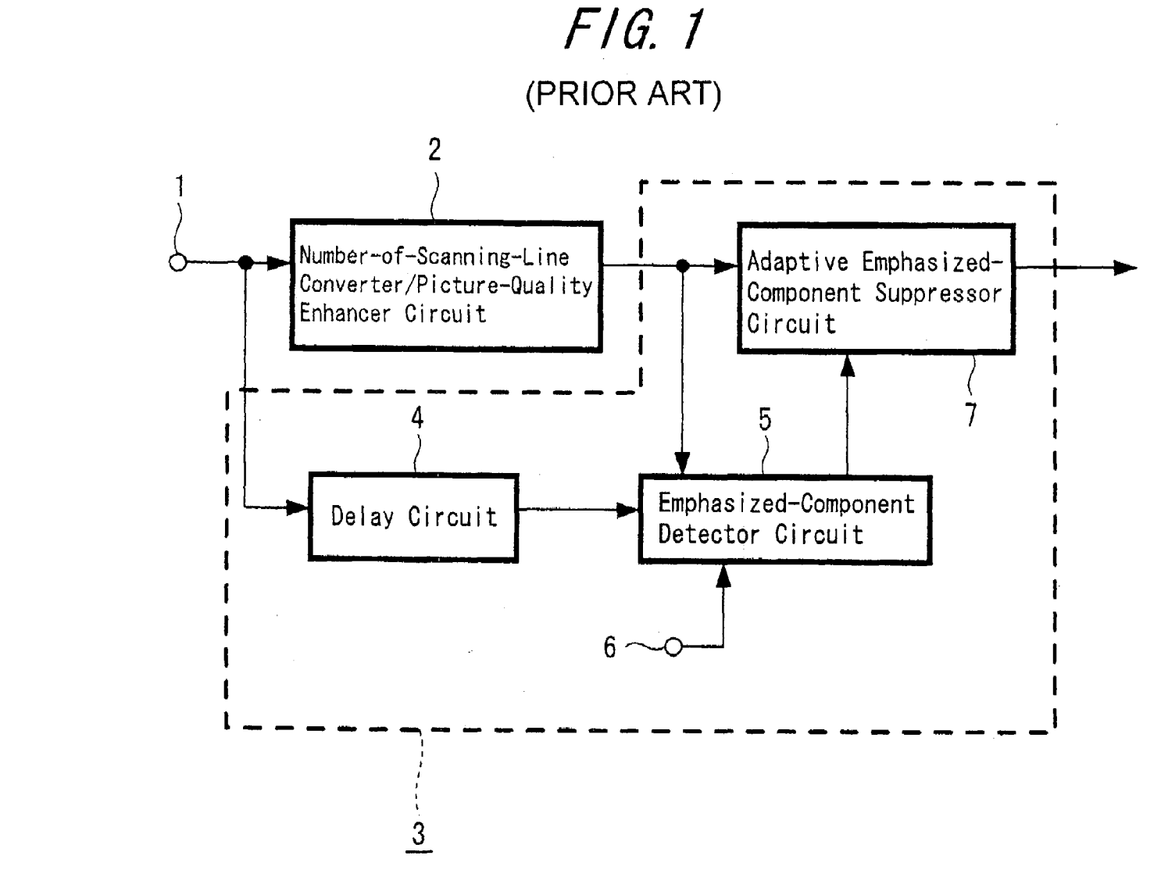
FIG. 1 is a block diagram showing a structure example of a conventional video-signal processor.

Specifically, as is shown in FIG. 1, a video signal input to an input terminal 1 is supplied to a number-of-scanning-line converter and picture-quality enhancer circuit 2 which performs a double-speed conversion of converting twice the number of scanning lines and also processing to enhance the picture quality depending on the picture at that time. An output of the number-of-scanning-line converter and picture-quality enhancer circuit 2 is supplied to an adaptive suppressing unit 3 against emphasized component, which suppresses a portion of a video component in the vertical direction overemphasized and provides an output video signal.

The adaptive suppressing unit 3 against emphasized component is provided with a delay circuit 4 for delaying the video signal input in the input terminal 1 by a time required for signal processing in the number-of-scanning-line converter and picture-quality enhancer circuit 2. An output of the delay circuit 4 and an output of the number-of-scanning-line converter and picture-quality enhancer circuit 2 are supplied to an emphasized-component detector circuit 5, which compares differences between the respective outputs and a reference signal level obtained at a reference-signal input terminal 6 with each other and detects an overemphasized component. When the emphasized-component detector circuit 5 detects the overemphasized component, the relevant portion of video signal is supplied to an adaptive emphasized-component suppressor circuit 7 which performs suppressive processing to output the processed signal.

Figure 2:
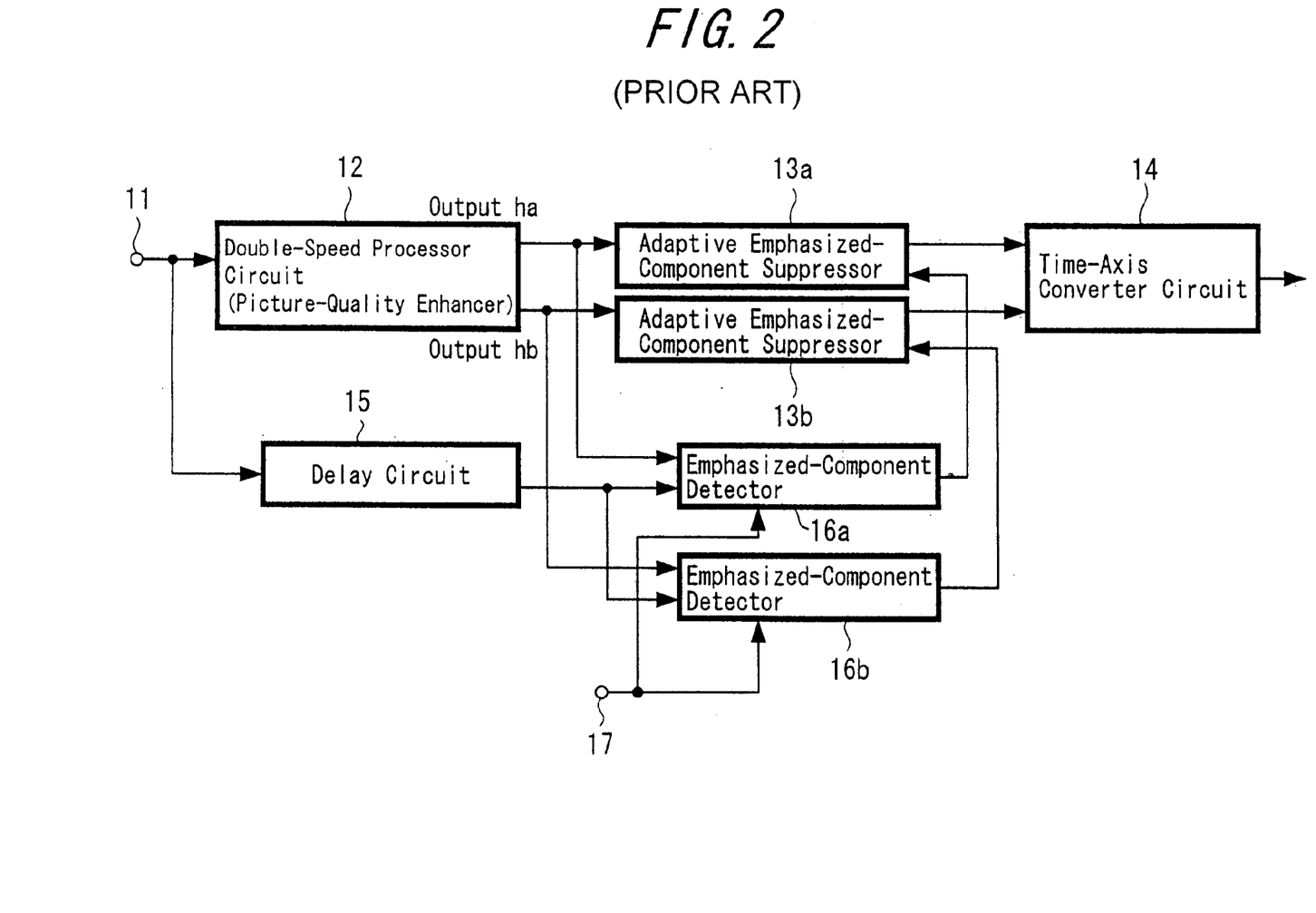
FIG. 2 is a block diagram showing a specific structure example of the conventional video-signal processor.

FIG. 2 is a diagram showing an example of more specific structure of processor circuits shown in FIG. 1. In this example, a video signal obtained at an input terminal 11 is supplied to a double-speed processor circuit 12 which performs the so-called double-speed conversion processing to convert twice the number of scanning lines. When the double-speed processor circuit 12 performs the double-speed conversion processing, it also performs the picture-quality enhancement processing. In this example, two scanning-line signals (the two signals are termed ha and hb) converted from one scanning-line signal by the double-speed conversion circuit 12 are output in parallel at the same time. The two scanning-line signals ha and hb are supplied to separate adaptive emphasized-component suppressor circuits 13a and 13b, respectively. Each of the adaptive emphasized-component suppressor circuits 13a and 13b performs suppressive processing on the emphasized component based on the respective outputs of separate emphasized-component detector circuits 16a and 16b. The adaptive emphasized-component suppressor circuit is also termed a peak limiter. Each output of the adaptive emphasized-component suppressor circuits 13a and 13b is supplied to a time-axis converter circuit 14 which converts the time axis for outputting each scanning-line signal and outputs the resulting signal as a video signal on one system.

Each of the emphasized-component detector circuits 16a and 16b receives each of the two scanning-line signals ha and hb output by the double-speed processor circuit 12, and also each of signals delayed by a time required for signal processing in the double-speed processor circuit 12. They further receive the reference level signal obtained at the reference-signal input terminal 17 respectively, and thus detect the overemphasized component in the vertical direction.

Each processing of detecting the emphasized component by the emphasized-component detector circuits 16a and 16b is performed as follows. For example, where a reference level is set by the reference signal obtained at the input terminal 17, a signal supplied from the delay circuit 15 being referred to as an input signal, and outputs of the double-speed processor circuit 12 being referred to as a converted signal, three differential signals of a. (input signal—reference level), b. (converted signal—reference level), c. (input signal—converted signal) will be obtained. A specific example using these three differential signals a, b, and c will be described below. When (differential signal a<0) and (differential signal b>0), the adaptive emphasized-component suppressor circuit 13a or 13b processes to suppress the number-of-scanning-line converted signal down to the reference level. When (differential signal a<0) and (differential signal b<0) the adaptive emphasized-component suppressor circuit 13a or 13b outputs the number-of-scanning-line converted signal as it is.

The reference-signal level is selected to characteristics of a display means (cathode-ray tube, etc.) which receives an output of this processor circuit. By selecting an appropriate reference level, it is possible to suppress the peak of over-emphasized video signal down to an appropriate level and utilize such emphasized-component that contributes to the picture-quality enhancement as it is.

However, in this kind of conventional emphasized-component suppression processing, the original signal and the converted signal compared with each other in the emphasized-component detector circuit (corresponding to emphasized-component detector circuits 16a and 16b in FIG. 2) are such that always reside in a fixed relation. Because of this fact, exact detection of emphasized component cannot be made, so that a properly emphasized component may be suppressed by mistake, or inversely the overemphasized component may not be suppressed, which will lead to picture-quality deterioration.

Moreover, when a phase of scanning lines created by the scanning-line conversion differs from a phase of input signal, only by comparing with the input signal delayed by the same time as that required for the number-of-scanning-line conversion process, the exact detection of emphasized component cannot be performed. This also poses the same problem that the duly emphasized component is suppressed erroneously or the overemphasized component cannot be suppressed.

The present invention has been made in view of the foregoing points and aims to enable satisfactory suppression of the overemphasized component when converting the number of scanning lines of video signal.

DISCLOSURE OF THE INVENTION

The first aspect of the present invention is a video-signal processing method comprising a number-of-scanning-line conversion step of converting the number of scanning lines of video signal, an emphasis step of emphasizing a high-frequency component at least in a vertical direction of the video signal converted in the number-of-scanning-line conversion step, a delay step of obtaining a delay signal delayed by a plurality of stages of time equal to or more than a time required for converting in the number-of-scanning-line conversion step, a selection step of selecting an appropriate delay signal from among the plurality of delay signals obtained in the delay step, a detection step of detecting an overemphasized component by comparing the delay signal selected in the selection step with the video signal emphasized in the emphasis step, and a suppression step of suppressing the emphasis with respect to a portion where the overemphasized component is detected in the detection step. By arranging in this way, it is possible to select a satisfactory signal to be compared with the emphasized component by selecting the appropriate delay signal from among the plurality of stages of delay signals and make satisfactory suppression of the overemphasized component for enhancing picture quality.

The second aspect of the present invention is such that, in the video-signal processing method according to the first aspect of the invention, the plurality of stages of delay signals in the delay step are a signal delayed by about a time required for converting in the number-of-scanning-line conversion step, and a signal further delayed by about one field period from the signal delayed by about the time required for converting in the number-of-scanning-line conversion step. By arranging in this way, a signal of one field before or one frame before can be utilized for detecting the emphasized component, so that a satisfactory signal to be compared with the emphasized component can be selected.

The third aspect of the present invention is such that, in the video-signal processing method according to the first aspect of the invention, the plurality of stages of delay signals in the delay step are a signal delayed by about a time required for converting in the number-of-scanning-line conversion step and a signal further delayed by about one field period from the signal delayed by about a time required for converting in the number-of-scanning-line conversion step, and in the selection step, a higher signal in level is selected from the two delay signals. By doing in this way, it is possible to select an appropriate delay signal by comparatively simple structure of making a mere level comparison.

The fourth aspect of the present invention is such that, in the video-signal processing method according to the first aspect of the invention, the number-of-scanning-line conversion step is that of doubling the number of scanning lines of the original video signal, the plurality of stages of delay signals in the delay step being a signal delayed by about a time required for converting in the number-of-scanning-line conversion step and a signal further delayed by about one field period from the signal delayed by about a time required for converting in the number-of-scanning-line conversion step, and in the selection step, a higher signal in level being selected from the two delay signals with respect to one of two adjacent lines, and the signal delayed by about a time required for converting in the number-of-scanning-line conversion step being always selected with respect to the other line. By doing in this way, when a so-called double-speed conversion of doubling the number of scanning lines is performed for picture-quality enhancement, satisfactory suppression of the overemphasized component will be enabled in each line.

The fifth aspect of the present invention is such that, in the video-signal processing method according to the first aspect of the invention, the delay step is that of delay processing for obtaining a plurality of line signals employed for emphasizing in the emphasis step simultaneously, and the selection step is that for selecting the appropriate delay signal from among the plurality of line signals. By doing in this way, it is possible to make satisfactory detection of the overemphasized component depending on a state of the picture-quality enhancement processing at that time, and in turn make satisfactory suppression of the overemphasized component.

The sixth aspect of the present invention is a video-signal processing apparatus comprising a number-of-scanning-line conversion means for converting the number of scanning lines of a video signal, an emphasis means for emphasizing a high-frequency component at least in a vertical direction of the video signal converted by the number-of-scanning-line conversion means, a delay means for obtaining delay signals delayed by a plurality of stages of time equal to or more than a time required for converting in the number-of-scanning-line conversion means, a selection means for selecting an appropriate delay signal from among the plurality of delay signals obtained by the delay means, a detection means for detecting overemphasized component by comparing the delay signal selected by the selection means with the video signal emphasized by the emphasis means, and a suppression means for suppressing the emphasis on a portion where the overemphasized signal component is detected by the detection means. By doing in this way, it is possible to select a satisfactory signal to be compared with the emphasized component by selecting an appropriate delay signal from among the plurality of stages of delay signals, and make satisfactory suppression of the overemphasized component to aim at picture-quality enhancement.

The seventh aspect of the present invention is such that, in the video-signal processing apparatus according to the sixth aspect of the invention, the plurality of delay signals obtained by the delay means are a signal delayed by about a time required for converting in the number-of-scanning-line conversion means and a signal further delayed by about one field period from the signal delayed by about a time required for converting in the number-of-scanning-line conversion means. By doing in this way, it is possible to employ a signal one field before or one frame before for detection of emphasized component and select a satisfactory signal to be compared with emphasized component.

The eighth aspect of the present invention is such that, in the video-signal processing apparatus according to the sixth aspect of the invention, the plurality of stages of delay signals obtained by the delay means are a signal delayed by about a time required for converting in the number-of-scanning-line conversion means and a signal further delayed by about one field period from the signal delayed by about a time required for converting in the number-of-scanning-line conversion means, and the selection means selects a high-level signal from the two delay signals. By doing in this way, it is possible to select an appropriate delay signal by a comparatively simple structure of making a mere level comparison.

The ninth aspect of the present invention is such that, in the video-signal processing apparatus according to the sixth aspect of the invention, the number-of-scanning-line conversion means is that of doubling the number of scanning lines of the original video signal, the plurality of stages of delay signals obtained by the delay means being a signal delayed by about a time required for converting in the number-of-scanning-line conversion means and a signal further delayed by about one field period from the signal delayed by about a time required for converting in the number-of-scanning-line conversion means, and the selection means being designed to select a high-level signal from the two delay signals with respect to one of two adjacent lines and always select a signal delayed by about a time required for converting in the number-of-scanning-line conversion means with respect to the other line thereof. By doing in this way, satisfactory suppression of the overemphasized component will be enabled in each line, when the so-called double-speed conversion of doubling the number of scanning lines is performed to aim at picture-quality enhancement.

The tenth aspect of the present invention is such that, in the video-signal processing apparatus according to the sixth aspect of the invention, the delay means performs processing to delay for obtaining simultaneously a plurality of line signals which were employed for emphasizing by the emphasis means, and the selection means is designed to select the appropriate delay signal from among the plurality of line signals. By doing in this way, satisfactory detection of the overemphasized component can be performed depending on a state of processing for picture-quality enhancement at that time, and in turn satisfactory suppression of the overemphasized component can be performed.

BEST MODE FOR CARRYING OUT THE INVENTION

The first embodiment according to the present invention will be described below with reference to FIGS. 3 to 5.

Figure 3:
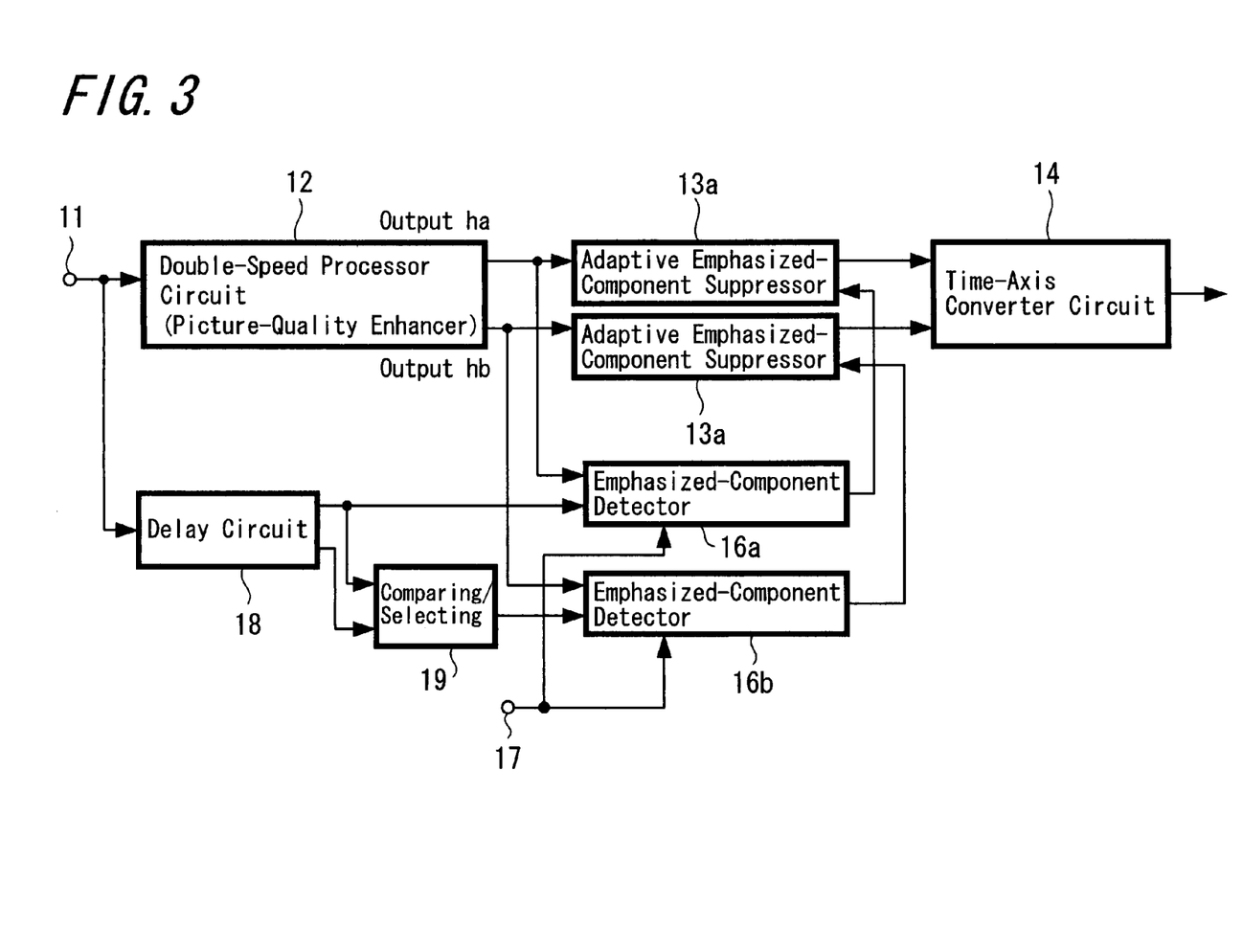
FIG. 3 is a block diagram showing a structure example of a first embodiment according to the present invention.

FIG. 3 is a diagram showing a structure example for making video-signal processing according to this embodiment. Circuits of this embodiment are those applied to a television set and the like, in which a video signal or the like received by a tuner is supplied to an input terminal 11. The video signal obtained at the input terminal 11 is supplied to a double-speed processor circuit 12 which performs the so-called double-speed conversion processing to double the number of scanning lines. In this case, the video signal obtained at the input terminal 11 is a digitized video signal and the double-speed conversion processing is performed in a digital form. When the double-speed processor circuit 12 performs the double-speed conversion processing, it also performs the picture-quality enhancement processing. This picture-quality enhancement processing may sometimes be varied depending on, for example, the kind of input picture (e.g. a natural picture, a picture including intense movement, and so on).

The double-speed processor circuit 12 outputs simultaneously in parallel two scanning-line signals ha and hb converted from one input scanning-line signal. The two scanning-line signals ha and hb are supplied to each of separate adaptive emphasized-component suppressor circuits (peak limiters) 13a and 13b, respectively. The respective adaptive emphasized-component suppressor circuits 13a and 13b performs processing to suppress the overemphasized component based on each output of the respective emphasized-component detector circuits 16a and 16b. Each output of the emphasized-component suppressor circuits 13a and 13b is supplied to a time-axis converter circuit 14, which converts the time-axis for outputting each scanning-line signal and outputs the video signal on one system. The structure on which the description has been given so far is basically the same as that of the prior-art example shown in FIG. 2.

In this embodiment, the two scanning-line signals ha and hb output by the double-speed processor circuit 12 are supplied to each of the emphasized-component detector circuits 16a and 16b. A delay circuit 18 provides a signal delayed by a time almost equal to a time required for signal processing in the double-speed processor circuit 12 (hereinafter termed a first delay signal) and a signal delayed by a time almost equal to a time required for signal processing in the double-speed processor circuit 12 plus one field period (for example, 1/60 seconds) (hereinafter termed a second delay signal). The first delay signal and the second delay signal output by the delay circuit 18 are supplied to a comparing and selecting circuit 19 which compares two levels of both the delay signals and performs processing to select one signal higher in level. This comparing and selecting processing is performed on each sample of the supplied video signal. Thus, the high-level signal will be selected every one sample.

The emphasized-component detector circuit 16a receives the first delay signal output by the delay circuit 18, one of the scanning-line signals ha output by the double-speed processor circuit 12, and a reference-level signal obtained at the reference-signal input terminal 17, and detects the emphasized component in a vertical direction by comparing with the reference level.

Also, the emphasized-component detector circuit 16b receives the first or second delay signal selected by the comparing and selecting circuit 19, the other scanning-line signal hb output by the double-speed processor circuit 12, and the reference-level signal obtained at the reference-signal input terminal 17, and detects the emphasized component in the vertical direction by comparing with the reference level.

In processing to detect the emphasized component by each of the emphasized-component detector circuits 16a and 16b, for example, where a reference level is set based on the reference signal obtained at the input terminal 17, the delay signal supplied from the delay circuit 18 or the comparing and selecting circuit 19 being an input signal, and an output of the double-speed processor circuit 12 being a converted signal, three differential signals of a. (input signal—reference level), b. (converted signal—reference level), and c. (input signal—converted signal) are obtained. To give a specific example using these three differential signals a, b, and c, when (differential signal a<0) and (differential signal b>0), the adaptive emphasized-component suppressor circuit 13a or 13b performs processing to suppress the converted signal down to the reference level. However, when (differential signal a<0) and (differential signal b<0), the converted signal is output as it is from the adaptive emphasized-component suppressor circuit 13a or 13b. The comparison in each of the emphasized-component detector circuits 16a and 16b is also performed every one sample. Each of the respective adaptive emphasized-component suppressor circuits 13a and 13b is designed to change conditions of suppression processing on each sample based on the comparison results at every one sample.

The reference level determined based on the reference signal obtained at the input terminal 17 is selected to characteristics of a display means (cathode-ray tube, etc.) to which an output of the suppressor circuit is supplied. By selecting a proper reference level, it is possible to suppress the peak of overemphasized video signal down to an appropriate level and utilize the emphasized component contributing to enhance the picture quality as it is.

Figure 4:
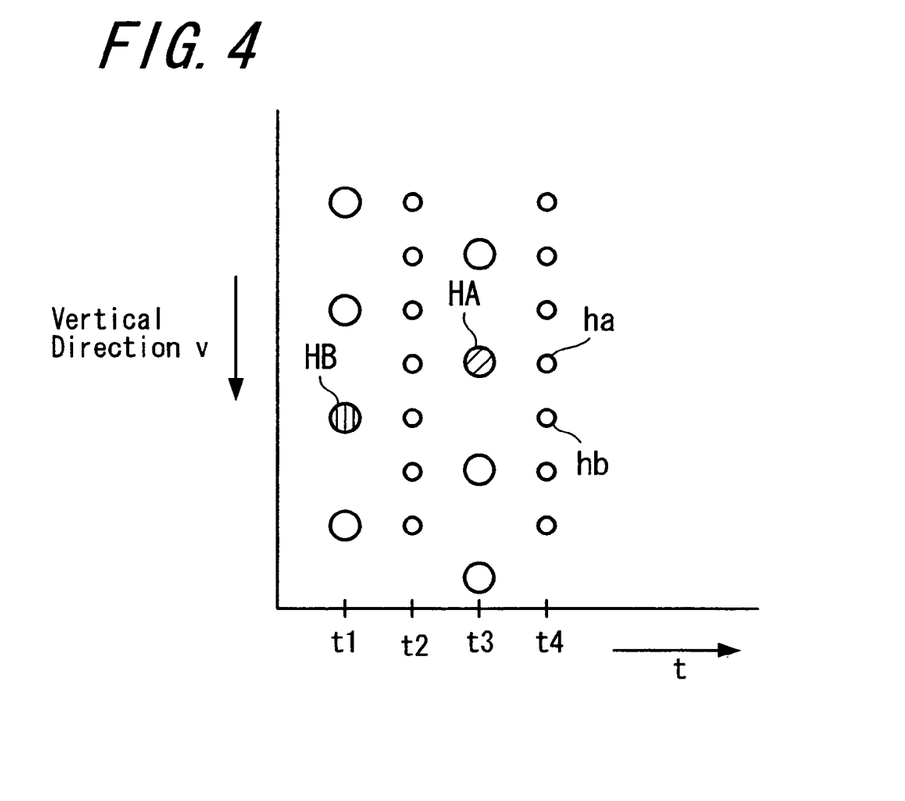
FIG. 4 is an explanatory diagram showing a conversion example according to the first embodiment.

FIG. 4 is a diagram showing an example of converting the number of scanning lines when a video signal is processed by such configuration. A horizontal axis of the diagram represents a time flow and each individual round mark represents one scanning line. Columns of scanning lines of a video signal within the same field are shown in a vertical direction. The diagram shows a state in which a video signal supplied to the input terminal 11 at time t1 is converted twice in the number of scanning lines and is output from the time-axis converter circuit 14 at time t2. Likewise, a video signal input at time t3 is converted twice in the number of scanning lines and is output at time t4. The input video at time t1 is in the interlaced relation with the input video at time t3 one field afterwards. These two fields constitute one frame. Therefore, a spatial position of each line of the input video at the time t1 is offset with a spatial position of each line of the input video at time t3.

On this occasion, for example, a signal of a specified line HA of the video signal input at time t3 is converted to signals of two lines ha and hb and output at time t4. In case of this example, during the double-speed conversion processing, the picture-quality enhancement processing is performed not only by referring to information on adjacent lines within the same field, but also referring to information within the adjacent field. Thus, for example, the signal of converted line ha shown in FIG. 4 is most likely to be created by referring to the signal of line HA of input video lying in almost the same spatial position, whereas the line signal of converted line hb is also likely to be created by referring to the signal of line HB one field before, lying in almost the same spatial position.

When the signals of lines ha and hb shown in FIG. 4 are output from the double-speed processor circuit 12 in FIG. 3, the signal of line ha is supplied to the adaptive emphasized-component suppressor circuit 13a. The emphasized-component detector circuit 16a for controlling the circuit 13a receives the first delay signal output by the delay circuit 18. The first delay signal corresponds to the signal of line HA shown in FIG. 4. Therefore, the emphasized-component detector circuit 16a detects the overemphasized component depending on differences between the signal of line HA as the input signal, the signal of line ha as the converted signal, and the reference level. At a sample position where the overemphasized component is detected, the adaptive emphasized-component suppressor circuit 13a performs processing to suppress the overemphasis. The adaptive emphasized-component suppressor circuit 13a and emphasized-component detector circuit 16a perform basically the same processing as that of the circuits shown in FIG. 2 as a prior-art example.

When the signal of line hb in FIG. 4 is supplied to the adaptive emphasized-component suppressor circuit 13b, the first or second delay signal selected as the delay signal by the comparing and selecting circuit 19 is supplied to the emphasized-component detector circuit 16b for controlling the circuit 13b. In this case, the first delay signal corresponds to the signal of line HA shown in FIG. 4 and the second delay signal corresponds to the signal of line HB shown in FIG. 4. Signals of the two lines are supplied to the comparing and selecting circuit 19, which selects a signal higher in level every one sample. The higher-level delay signal is supplied to the emphasized-component detector circuit 16b.

Figure 5:
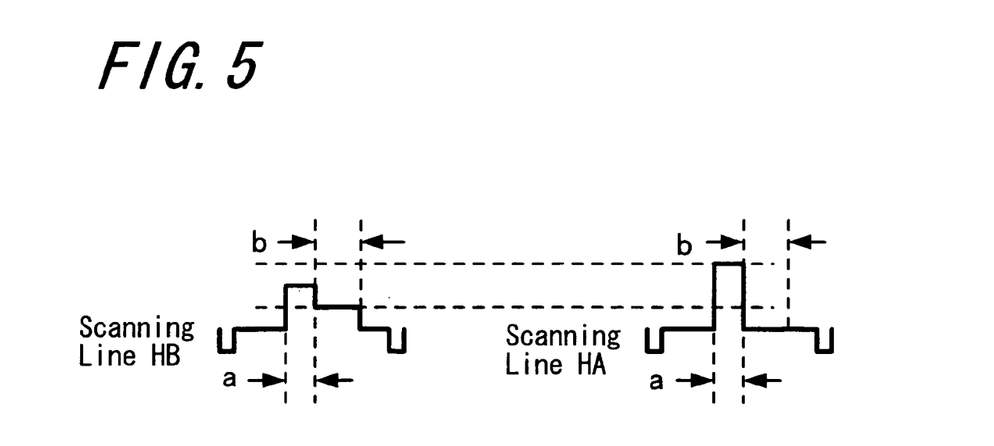
FIG. 5 is a diagram of signal waveform for explaining the processing according to the first embodiment.

An example of waveforms of signals of scanning lines HB and HA is shown in FIG. 5, in which the signal of scanning line HA is higher in section a of each scanning line, while the signal of scanning line HB is higher in section b. In such a case, the signal of scanning line HA (the first delay signal) is selected in section a, while the signal of scanning line HB (the second delay signal) is selected in section b to be supplied to the emphasized-component detector circuit 16b.

In this way, the higher-level delay signal is supplied to the emphasized-component detector circuit 16b, where the signal of line HA or HB as the input signal and the converted signal of line hb are respectively compared with the reference level, and the overemphasized component is detected depending on differences between them. On the sample position where the overemphasized component is detected, the adaptive emphasized-component suppressor circuit 13b performs processing to suppress the overemphasis. It is noted that, because a higher-level signal of the first and second delay signals is selected as the delay signal to be supplied, there may be a case where the closest signal in time (the first delay signal) is selected as the comparison object in the emphasized-component detector circuit 16b, or a case where the closest signal in phase (the second delay signal) is selected as that object, thereby allowing the emphasized component to be accurately detected depending on signal conditions and allowing the suppression of overemphasized component to be performed more precisely than before.

Therefore, when there is the overemphasis leading to deterioration of the picture quality in a process of enhancing the picture quality, by detecting the overemphasized component to suppress, it is possible to display a natural picture as an object of picture-quality improvement with higher quality, and display also an artificial picture such as the telop liable to deteriorate without loss of picture quality. Satisfactory suppression of the overemphasis spreads flexibility of picture-quality enhancement processing in the picture-quality enhancer circuit, thus enabling picture quality to be improved better than before. Having described so far an example in which the number of scanning lines is converted twice, the present invention is applicable to a case where the number of scanning lines is converted by any scaling factor, and can maintain its picture quality independently of the scaling factor in converting the number of scanning lines and a phase relation between input signal and output signal. Therefore, it will be possible to select more freely a video display means (cathode-ray tube, liquid crystal display panel, etc.) of a display unit in which this circuit is incorporated. This means that, for example, the same picture-quality enhancer circuit can be employed in a display unit using the cathode-ray tube as a display means and also in a display unit using the liquid crystal display panel as a display means, whereby general versatility of the circuit is improved.

Additionally, in the example in FIG. 3, although the delay signal one field before is compared with the other delay signal to select one of them with respect to only one of two lines converted twice, the same comparison and selection may be performed when emphasized components in all lines are detected.

Next, the second embodiment according to the present invention will be described with reference to FIGS. 6 and 7.

Figure 6:
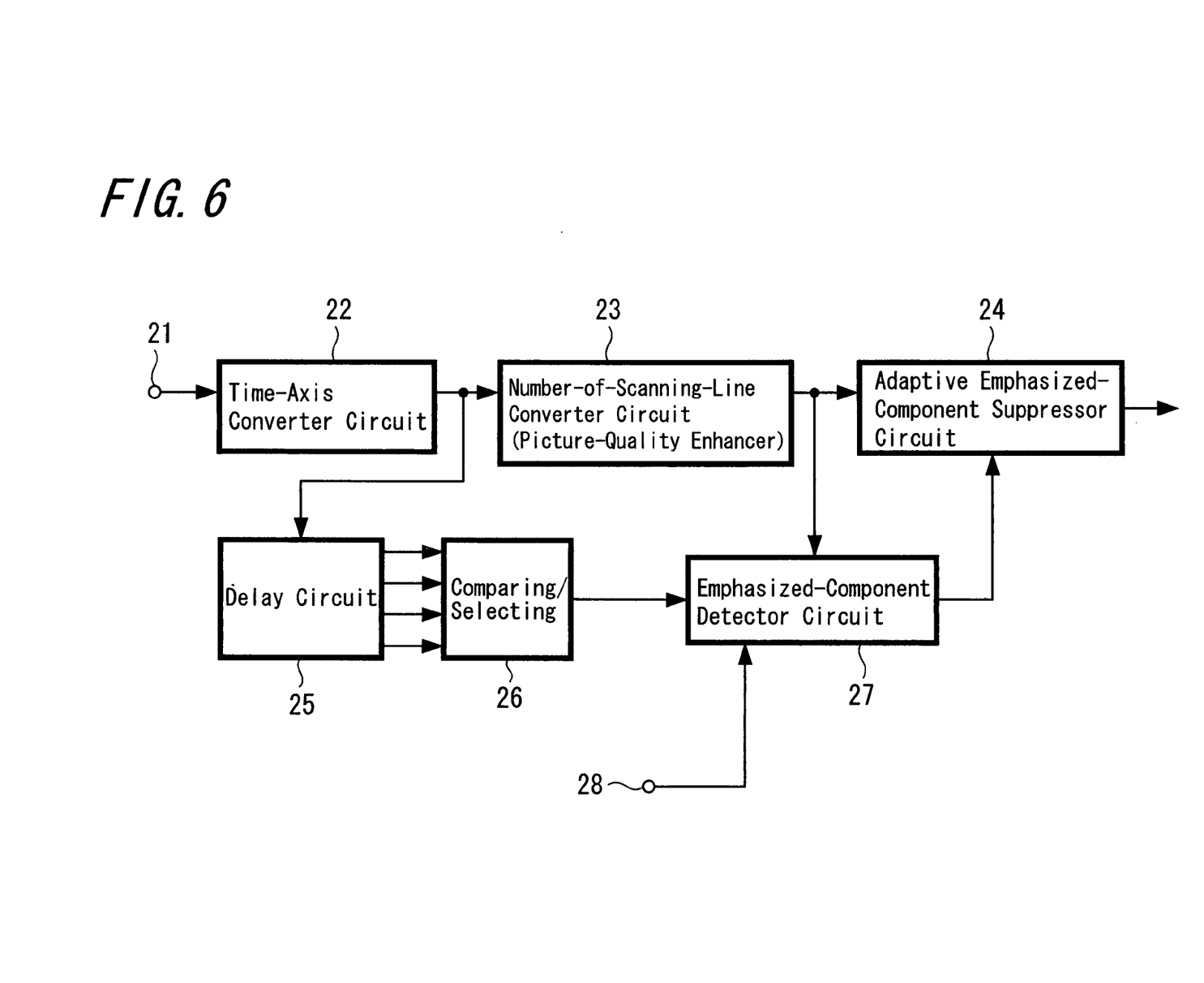
FIG. 6 is a block diagram showing a structure example of a second embodiment according to the present invention.

FIG. 6 is a diagram showing a structure example of performing video-signal processing according to this embodiment. In this example, a video signal obtained at an input terminal 21 is supplied to a time-axis converter circuit 22, which performs processing of converting twice the number of scanning lines of the input video signal. However, this circuit 22 performs only time-axis conversion processing which repeats a signal of the same line merely twice to output. The signal converted twice in the number of scanning lines by the time-axis converter circuit 22 is supplied to a number-of-scanning-line converter circuit 23 for picture-quality enhancement processing. In this processing to enhance picture quality, signals of the adjacent line, signals of the adjacent field or the like are referred to.

The video signal double-speed-converted and enhanced in picture quality by the number-of-scanning-line converter circuit 23 is supplied to an adaptive emphasized-component suppressor circuit (peak limiter) 24, which performs processing to suppress overemphasized component based on an output of an emphasized-component detector circuit 27. The circuit 27 outputs a signal whose overemphasized component is suppressed to supply the resulting signal to a subsequent circuit (not shown). The adaptive emphasized-component suppressor circuit 24 performs processing to suppress the overemphasized component depending on a state of the overemphasized component detected by the emphasized-component detector circuit 27.

Signals supplied to the emphasized-component detector circuit 27 are now described. In this example, an output of the time-axis converter circuit 22 is supplied to a delay circuit 25 to obtain four delay signals that are different in a delay time respectively. An example of these four delay signals will be given here. They are, for example, a signal delayed by a time nearly equal to that required for processing in the number-of-scanning-line converter circuit 23 (a first delay signal), a signal further delayed by one field period from the first delay signal (a second delay signal), a signal delayed for obtaining a signal one line earlier than the first delay signal (a third delay signal), and a signal delayed for obtaining a signal one line earlier than the second delay signal (a fourth delay signal). The above period of one field or one line is the period before the number of scanning lines is converted.

The four delay signals (the first to fourth delay signals) are supplied to a comparing and selecting circuit 26, which compares them and selects the optimum-level signal (for example a signal on the highest level) every one sample. The selected signal is supplied to the emphasized-component detector circuit 27. Other than the output of the comparing and selecting circuit 26, an output of the number-of-scanning-line converter circuit 23 and the reference signal obtained at the reference-signal input terminal 28 are supplied to the emphasized-component detector circuit 27, which detects overemphasized component from the difference between the reference level and each of the above signals. The processing to detect the overemphasized component is basically the same as that of the emphasized-component detector circuit 16a and 16b described on the first embodiment.

In addition, it may be arranged to acquire information on a state of conversion or the like in the number-of-scanning-line converter circuit 23 and change a selecting manner in the comparing and selecting circuit 26 according to that information. In other words, instead of always selecting the highest-level signal from among four delay signals, it may be arranged to select the highest-level signal or the like from any of two or three delay signals depending on the state of conversion or the like in the number-of-scanning-line converter circuit 23 at that time.

By virtue of the structure as shown in FIG. 6, it is possible to select more suitable signal as the comparison object and detect the overemphasized component depending on the state of conversion for enhancing picture quality in the number-of-scanning-line converter circuit 23 at that time. It is assumed that, for example, the number of scanning lines of input video signal is converted in a conversion example shown in FIG. 7. The same as FIG. 4 already described, a horizontal axis of FIG. 7 represents a time flow, and each individual round mark represents one of scanning lines. Columns of scanning lines of video signal within the same field are shown in a vertical-axis direction. FIG. 7 shows that a video signal supplied to the input terminal 21 at time t1 is converted twice in the number of scanning lines and is output from the number-of-scanning-line converter circuit 23 at time t2. Likewise, a video signal input at time t3 is converted twice in the number of scanning lines and output at time t4. In this example, the video signal input at time t1 is also in the interlaced relation with the video signal input at time t3 one field afterwards. These two fields make one frame. Therefore, a spatial position of each line of video signal input at time t1 is offset with that of each line of video signal input at time t3.

Incidentally, looking at, for example, a signal on a specific line HA of video signal input at a time t3, a converted line ha at the same spatial position as that of HA, a line hb immediately afterwards, and further a line hc one line before, signals of these lines ha, hb, and hc may be converted from signals of lines HA, HB, and HC in original two fields (signals of group g1) or may be converted from signals of lines HA, HB, HC and HD in original two fields (signals of group g2) and so on. By choosing appropriate conditions of selection in the comparing and selecting circuit 26 depending on those conversion modes, it will be possible to make satisfactory detection of the overemphasized component and in turn suppress the overemphasized component more precisely.

Figure 7:
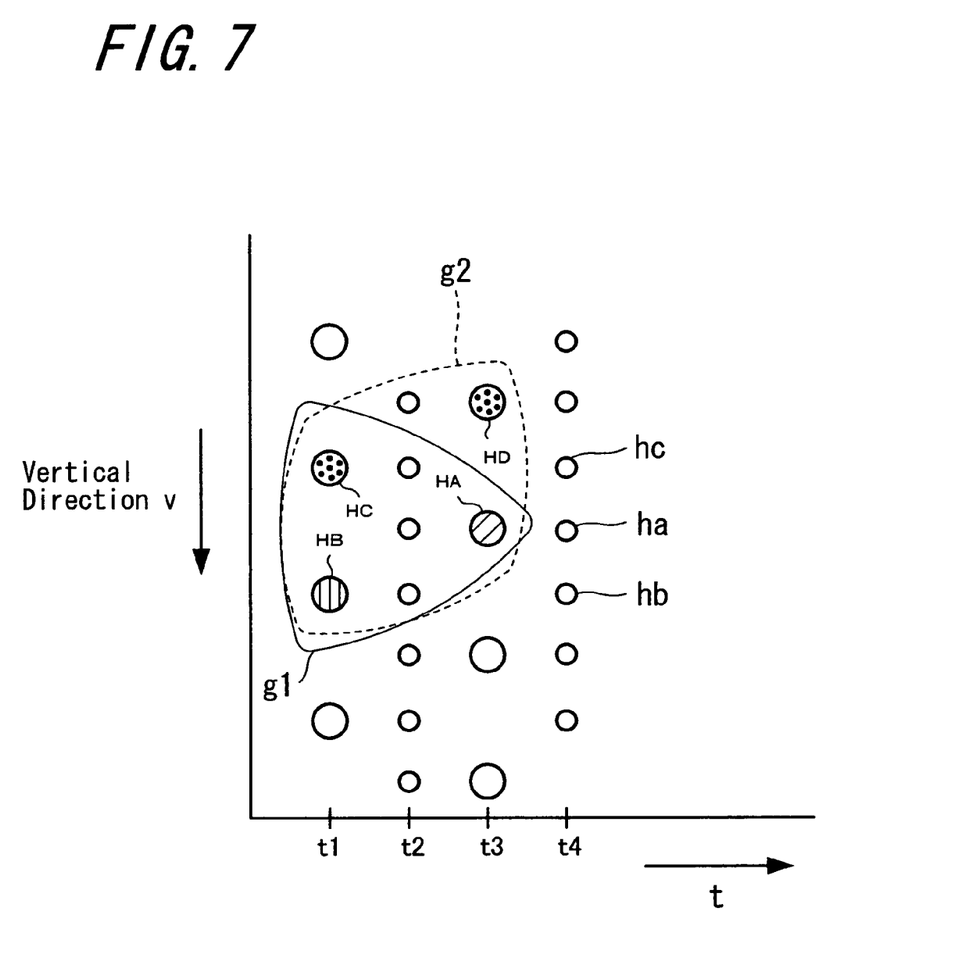
FIG. 7 is an explanatory diagram showing a conversion example according to the second embodiment.

In addition, FIG. 7 shows an example of how to select the groups g1 and g2, so that it may be arranged to select appropriate signals from among signals within other range.

Although, in the above-described embodiments, the circuit for processing to enhance picture quality of video signal has been shown as a separate one from the delay circuit, the circuit for processing video signal may often be composed including the delay circuit. In such a case, a signal delayed by an incorporated delay circuit may be supplied to the emphasized-component detector circuit for detection.

Having described, in the above-described embodiment, an example of the case where the double-speed conversion converts twice the number of scanning lines, the present invention is applicable to a case where the number of scanning lines is converted twice or more, and also applicable to a case where the number of scanning lines is converted to the number other than an integer.

The invention claimed is:

1. A video-signal processing method comprising the steps of:
    converting the number of scanning lines of a video signal,
    emphasizing a high-frequency component at least in a vertical direction of the video signal converted in said number-of-scanning-line conversion step,
    obtaining a delay signal delayed by a plurality of stages of time equal to or more than a time required for converting in said number-of-scanning-line conversion step,
    selecting an appropriate delay signal from among the plurality of delay signals obtained in said delay step,
    detecting an overemphasized component by comparing the delay signal selected in said selection step with the video signal emphasized in said emphasis step, and
    suppressing the emphasis with respect to a portion where the overemphasized signal component is detected in said detection step.

2. A video-signal processing method according to claim 1, wherein
    the plurality of stages of delay signals in said delay step are a signal delayed by approximately a time required for converting in said number-of-scanning-line conversion step and a signal further delayed by approximately one field period from the signal delayed by approximately the time required for converting in said number-of-scanning-line conversion step.

3. A video-signal processing method according to claim 1, wherein
    the plurality of stages of delay signals in said delay step are a signal delayed by approximately a time required for converting in said number-of-scanning-line conversion step and a signal further delayed by approximately one field period from the signal delayed by approximately the time required for converting in said number-of-scanning-line conversion step, and
    in said selection step, a signal higher in level is selected from the two delay signals.

4. A video-signal processing method according to claim 1, wherein
    the number of scanning lines of an original video signal are converted twice in the number-of-scanning-line conversion step,
    the plurality of stages of delay signals in said delay step being the signal delayed by approximately the time required for converting in said number-of-scanning-line conversion step and the signal further delayed by approximately one field period from the signal delayed by approximately the time required for converting in said number-of-scanning-line conversion step, and
    in said selection step, processing to select a signal higher in level being performed with respect to one of two adjacent lines and the signal delayed by the time required for converting in said number-of-scanning-line conversion step being always selected with respect to the other line.

5. A video-signal processing method according to claim 1, wherein
    in said delay step, delay processing is performed for obtaining simultaneously the plurality of line signals employed for emphasizing in said emphasis step, and
    in said selection step an appropriate delay signal is selected from among the plurality of line signals.

6. A video-signal processing apparatus comprising
    a number-of-scanning-line conversion means for converting the number of scanning lines of a video signal,
    an emphasis means for emphasizing a high-frequency component at least in a vertical direction of the video signal converted by said number-of-scanning-line conversion means,
    a delay means for obtaining signals delayed by a plurality of stages of time equal to or more than a time required for converting in said number-of-scanning-line conversion means,
    a selection means for selecting an appropriate delay signal from among the plurality of delay signals obtained by said delay means,
    a detector means for detecting an overemphasized component by comparing the delay signal selected by said selection means with the video signal emphasized by said emphasis means, and
    a suppression means for suppressing the emphasis with respect to a portion where the overemphasized-signal component is detected by said detection means.

7. A video-signal processing apparatus according to claim 6, wherein
    the plurality of stages of signals delayed by said delay means are a signal delayed by approximately a time required for converting in said number-of-scanning-line conversion means and a signal further delayed by approximately one field period from the signal delayed by approximately the time for converting in said number-of-scanning-line conversion means.

8. A video-signal processing apparatus according to claim 6, wherein
   the plurality of stages of delay signals by the delay means are the signal delayed by approximately the time required for converting in the number-of-scanning-line conversion means and the signal further delayed by approximately one field period from the signal delayed by approximately the time required for converting in said number-of-scanning-line conversion means, and
   said selection means selects a signal higher in level from the two delay signals.

9. A video-signal processing apparatus according to claim 6, wherein
   said number-of-scanning-line conversion means is the means for converting twice the number of scanning lines of the original video signal,
   the plurality stages of delay signals by said delay means are the signal delayed by approximately the time required for converting in said number-of-scanning-line conversion means and the signal further delayed by approximately one field period from the signal delayed by approximately the time required for converting in said number-of-scanning-line conversion means, and
   said selection means selects the signal higher in level from the two delay signals with respect to one of the adjacent two lines and always selects the signal delayed by the time required for converting in said number-of-scanning-line conversion means with respect to the other line.

10. A video-signal processing apparatus according to claim 6, wherein
    said delay means performs delay-processing to obtain simultaneously a plurality of line signals employed for emphasizing by said emphasis means, and
    said selection means selects an appropriate delay signal from among the plurality of line signals.

* * * * *